Jan. 7, 1930. J. A. ANDERSON 1,742,678
HARROW
Original Filed Feb. 19, 1926 2 Sheets-Sheet 2

WITNESS:
Gust. Hjelm

INVENTOR:
J. A. Anderson
BY H. J. Sanders
ATTORNEY

Patented Jan. 7, 1930

1,742,678

UNITED STATES PATENT OFFICE

JOHN ALFRED ANDERSON, OF CHICAGO, ILLINOIS

HARROW

Application filed February 19, 1926, Serial No. 89,378. Renewed May 23, 1929.

This invention relates to improvements in harrows and more particularly to harrows provided with folding frames. One object is to provide a harrow of this type that is simple in construction, cheap to manufacture, durable and efficient in operation.

With the foregoing and other objects in view the invention consists in the combination and arrangement of parts to be hereinafter fully described, pointed out in the appended claims and illustrated in the accompanying drawings which form a part of this application and in which—

Like reference characters denote corresponding parts throughout the several views.

Figure 1:
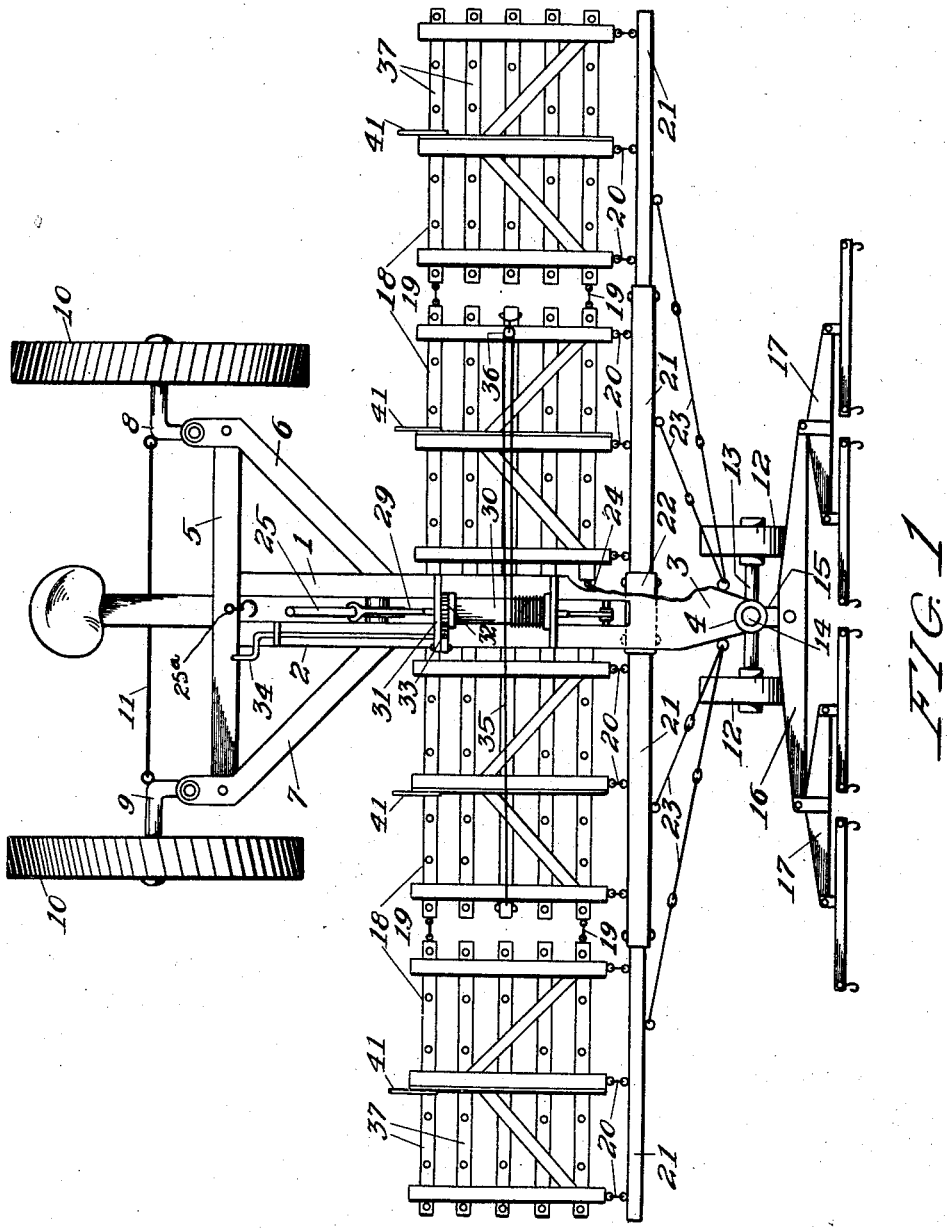
Fig. 1 is a plan view of the harrow.
Figure 2:
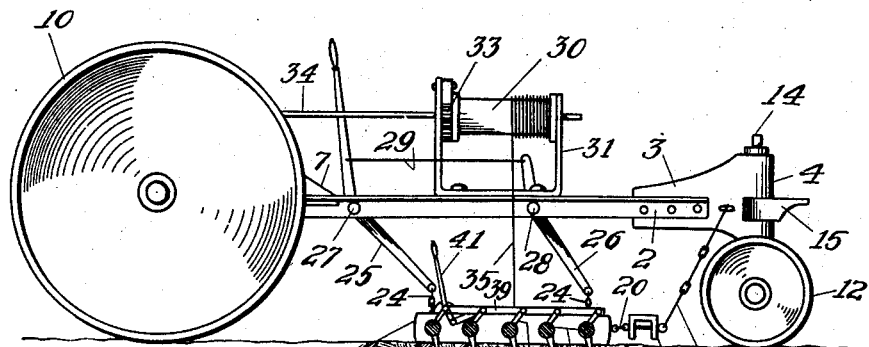
Fig. 2 is a side view of the machine.

The main frame of the machine comprises the two spaced steel angle bars 1, 2 which at their forward ends are connected to the extension 3 of the frame head 4 and at their rear ends are connected by the cross bar 5 which is connected by the brace bars 6, 7 to the frame bars 1, 2, the rear ends of said brace bars being of sleeve-like formation to receive the upturned ends of the stub axles 8, 9 of the rear wheels 10, said axles being connected by the cross rod 11.

The front wheels 12 are connected by the front axle 13 integral with the steering post 14 disposed in the head 4, a link 15 fast to said post 14 extends through a perforation in the said head and has connected thereto the bar 16 that carries the doubletrees 17.

A plurality, in this case four, of harrow knife frames 18 are connected together by links 19 and at their forward ends are connected by links 20 to the inverted U-shaped draft bar composed of sections 21 pivotally connected together, the two central sections 21 being pivotally connected to the link 22, each draft bar section being connected by a sectional rod 23 to the frame head 4.

The central harrow frames are connected by links 24 to levers 25 and 26 which are fulcrumed respectively, upon the short rods 27, 28 between the frame bars 1, 2, said levers being connected by the rod 29 to cause them to move in unison. A cable drum 30 is mounted in a frame 31 carried upon the main frame, the shaft of said drum having a gear wheel 32 fast thereupon and in mesh with a pinion 33 fast upon the hand rod 34 rotation of which will cause rotation of said drum.

Figure 3:
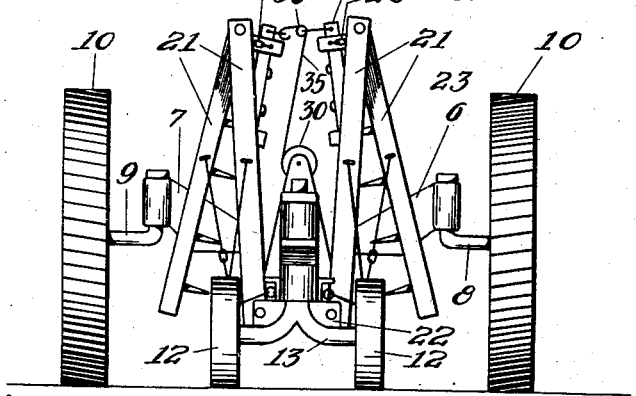
Fig. 3 is a front view with the frame in a folded position.
Figure 4:
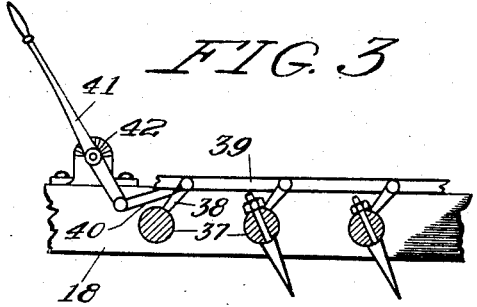
Fig. 4 is an enlarged fragmentary sectional view showing the blade carrying and adjusting mechanism.

The cable 35 has one end fastened to said cable drum and is wound upon said drum, said cable passing also about the sheave 36 carried by one of the central harrow frames 18, one end of the cable being secured to the other central harrow frame 18, the cable being so connected to said central harrow frames that the pull, as the cable is wound upon the drum, is upon the relatively remote sides of the harrow frames so that said sides will buckle as shown in Fig. 3. The lever 25 is now moved in a direction toward the rear wheels thus raising the folded harrow frames clear of the ground so that they will not drag as the machine is moved across the field. A hook 25ᵃ carried by bar 5 may be engaged with the lever 25 to hold it in position. In again moving the harrow frames into operative position the outer frames are manually moved outwardly from their free ends and the drum then rotated to unwind the cable to permit the central frames to descend.

Each harrow shaft 37 has fast thereto a link 38 that is connected to a span bar 39 that extends lengthwise of the harrow frame, said span bar being connected by a link 40 to the hand lever 41 fulcrumed to the rack 42 carried by the frame so that the depth of cut of the knives into the earth may be regulated.

What is claimed is:—

1. In a harrow, a main frame, wheels therefor, centrally disposed harrow frames linked together, outwardly disposed harrow frames linked to said central harrow frames, connected lift levers fulcrumed to said main frame and linked to said centrally disposed harrow frames at their relatively adjacent sides, a cable drum carried by said main frame, a cable connected to and wound upon said drum and connected to the relatively remote sides of said centrally disposed harrow frames, a rotary hand rod, connection between said drum and hand rod for transmitting motion from the latter to said drum, a sectional draft bar, connection between the sections thereof and said harrow frames, and connection between the draft bar and main frame.

2. In a harrow, a main frame, wheels therefor, centrally disposed connected harrow frames, outwardly disposed harrow frames connected to said central harrow frames, lift levers fulcrumed to said main frame and connected to said centrally disposed harrow frames, a cable drum carried by said main frame, a cable connected thereto and to said central harrow frames at their relatively remote sides, means for actuating said drum, and flexible connection between said harrow frames and the main frame.

In testimony that I claim the foregoing as my own I have hereto affixed my signature.

JOHN ALFRED ANDERSON.